UNITED STATES PATENT OFFICE.

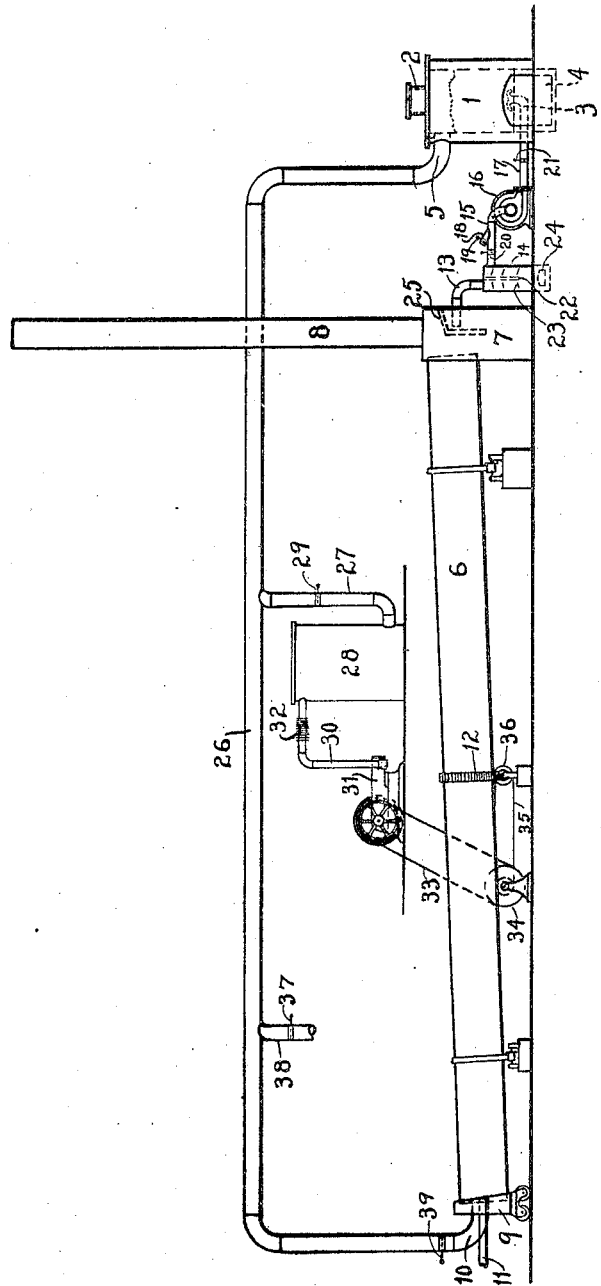

CARLETON ELLIS, OF NEW YORK, N. Y., ASSIGNOR TO ELDRED PROCESS COMPANY, OF NEW YORK, N. Y., A CORPORATION OF NEW YORK.

PROCESS OF GENERATING GAS.

No. 798,176.     Specification of Letters Patent.     Patented Aug. 29, 1905.

Application filed March 25, 1905. Serial No. 251,936.

*To all whom it may concern:*

Be it known that I, CARLETON ELLIS, a citizen of the United States, and a resident of New York city, in the county of New York and State of New York, have invented certain new and useful Improvements in the Process of Generating Combustible Gas, of which the following is a specification.

This invention relates to a method for the manufacture of producer-gas in which an endothermically-reacting fixed gas is used for regulating the temperature of the gas-producer instead of the commonly-used steam.

It relates particularly to the use of carbon dioxid obtained from the burning of cement-forming material. The products of ordinary combustion contain a total of free and combined oxygen amounting at the most to twenty-one per cent. by volume. In the burning of cement the decomposition of the limestone or carbonate of lime which the raw material contains gives rise to carbon dioxid. Consequently the products of combustion and calcination contain a greater amount of free and combined oxygen than is found in ordinary products of combustion, and there is therefore proportionately less nitrogen present in these gases. In passing such a mixture through a gas-producing mass of fuel the free and combined oxygen is largely reduced to the form of carbon monoxid and gives rise to a gas containing more combustible matter than that which would be produced if the products of ordinary combustion were employed. The waste gases from a cement-kiln are also contaminated by dust and are in that condition unfit for direct use in the manufacture of producer-gas.

It is the object of this invention to operate the gas-producing mass in such a manner that due allowance is made for the relatively low amount of nitrogen present. It is further the object to purify the gas properly before its use as a gasifying medium.

In the accompanying diagrammatic drawing, 1 represents a gas-producer having the hopper 2 for the introduction of fuel, the blast-twyers 3, and a water seal 4. 5 is the gas-outlet pipe. Adjacent to the gas-producer is situated an inclined rotary cement-kiln 6, whose upper part is incased by the housing 7, with which is connected the stack 8. The lower or clinker-discharge end of the kiln is closed by the header 9.

10 is a pipe for the introduction of gaseous fuel, and 11 an air-blast pipe. 11 may also be used as a powdered-fuel-feed pipe. The kiln 6 is revolved by a worm working in the gearing 12. The gases from the cement-kiln 6 are withdrawn at the upper part of the kiln by means of pipe 13 and enter the dust collector, separator, and purifier 14. This is an important and essential part of the apparatus employed in the operation of my process.

15 is a passage connecting purifier 14 with the fan-blower 16. The fan is connected to the gas-producer by the passage 17. In the passage 15 is placed the air-inlet 18, controlled by the valve 19. The amount of products of combustion drawn back by the fan is controlled by the valve or damper 20.

21 is a damper regulating the volume of the blast to the producer.

22 is a partition in the purifier 14. Vanes for precipitating and removing the dust are shown at 23. A settling chamber and pit for the removal of the dust is situated at 24.

25 is a shield over the inlet of passage 13 to act as a baffle for the removal of dust.

26 is a gas-conduit extending to the clinker-discharge end of the kiln. From this conduit the pipe 27 extends to a gas-scrubber 28. A damper 29 is placed in this passage.

30 is a passage connecting the scrubber 28 with a gas-engine 31. A cooling or heat-radiating arrangement is shown diagrammatically in the passage 30. The gas-engine is connected by the belting 33 with the counter-shaft 34, which actuates the kiln 6 through belt 35 and mechanism 36. An outlet-pipe in the conduit 26 is shown at 38, having the damper 37. At this point the gas may be drawn away to be used elsewhere for other purposes than those described.

39 is a damper regulating the supply of gas to the kiln 6 when it is heated by the gaseous fuel.

My method of operation is as follows: A deep bed of fuel is brought to a state of suitable ignition in the gas-producer. When this bed is of the proper depth and is of such temperature that it is capable of making a gas rich in combustible elements, the fan 16 may be put in operation to produce the required blast for gasification. This fan creates a suction which results in the withdrawal from the head of the kiln of gases rich in carbon dioxid and relatively low in nitrogen. Before entering the passage 13 these gases impinge to a greater or less degree upon the shield 25, and the large amount of dust which they carry is removed by the baffling action of aforesaid shield. Entering the passage 13 the gases pass into the purifier 14, where by the baffling action of the vanes 23 the dust is removed. To the purifier herewith shown a second or third purifier may be attached, if desired, in order to remove all traces of cement-dust or other dust from the gas. In the passage 15 an addition of air is made to create a mixture which contains sufficient oxygen or exothermic agent and sufficient carbon dioxid or endothermic agent to maintain an equilibrium of temperature in the gas-producer at a point below the slagging or clinkering point of the fuel. For this reason the dampers 19 and 20 should be adjusted to meet existing conditions in order to properly proportion the amount of the reacting gases. The combustible gas departing from the producer may take one of three courses. It may enter the gas-scrubber 28 and be used to operate the gas-engine 31, or it may enter the kiln at 10 and be used either alone or in conjunction with powdered fuel for the burning of cement, or it may depart through the conduit 38.

Aside from the regulation of the proportion of carbon dioxid to oxygen in the blast supplied to the producer the most vital and essential feature of this process is the proper purification of the stack-gases. When these gases leave the kiln, they are invariably heavily charged with dust, this being caused by the introduction at that point of the finely-ground raw material and also to the ash of the coal where powdered fuel is used. For that reason I have found it essential to purify the gas with great care. The simplest method is to use baffles, by the means of which the dust is deflected into a trap and the gas then withdrawn in a fair state of purity. I do not limit myself, however, to such a method of purification, as I may also employ a centrifugal separator and also a filtering arrangement for this purpoose. I also can use, alone or in conjunction with this system of baffles, a stream or spray of water, by means of which the gases may be washed and all particles in mechanical suspension removed.

What I claim as my invention is—

1. Process of manufacturing combustible gas which consists in withdrawing the gaseous products of combustion and decomposition containing less nitrogen than that present in the products of ordinary combustion, in company with solid matter in a fine state of division from a cement-kiln, in separating the suspended impurities and in mixing the purified gas with a quantity of oxygen or air sufficient to maintain the gas-producing mass at a temperature below the slagging or clinkering points of the fuel.

2. Process for generating combustible gas which consists in withdrawing from a cement-kiln the gases of combustion and calcination containing less nitrogen than that present in normal products of combustion, and charged with dust, in filtering and removing said dust, in mixing the gas with a quantity of air sufficient to form a mixture which will depress and maintain the temperature of the gas-producer below the clinking and slagging points of the fuel employed.

3. Process for generating combustible gas which consists in inducing from the stack-discharge end of a cement-kiln gaseous products of combustion and calcination containing a relatively large amount of carbon dioxid and a relatively small amount of nitrogen and charged with fine particles of solid matter, in removing the latter by deposition, in mixing with the purified gas a predetermined amount of air or oxygen, in forcing the gaseous mixture through a deep bed of non-flaming fuel, whereby reduction of said carbon dioxid and oxygen to carbon monoxid occurs, in collecting the combustible gas so formed and in delivering it unburned to the place of consumption.

4. Process of generating combustible gas, which consists in withdrawing the dust-laden gaseous products of combustion and decomposition, containing less nitrogen than that present in the products of ordinary combustion, from a cement-kiln; in removing substantially all of the dust; in mixing the purified gaseous products with a quantity of air sufficient to maintain the gas-producing mass at an efficient gasifying temperature; and in continuously passing a mixture of this character through the gas-producing mass.

Signed at New York city, in the county of New York and State of New York, this 23d day of March, A. D. 1905.

CARLETON ELLIS.

Witnesses:
JAS. K. CLARK,
WARREN E. DIXON.